(12) United States Patent
Fallgren et al.

(10) Patent No.: US 8,135,407 B2
(45) Date of Patent: Mar. 13, 2012

(54) NETWORK EVALUATED HARD HARDOVER USING PREDICTIONS

(75) Inventors: Anna Fallgren, Danderyd (SE); Walter Müller, Upplands Väsby (SE); Paolo Guidotti, Casalecchio (IT); Göran Rune, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 782 days.

(21) Appl. No.: 12/083,343

(22) PCT Filed: Dec. 9, 2005

(86) PCT No.: PCT/SE2005/001886
§ 371 (c)(1),
(2), (4) Date: Apr. 10, 2008

(87) PCT Pub. No.: WO2007/067113
PCT Pub. Date: Jun. 14, 2007

(65) Prior Publication Data
US 2009/0239536 A1    Sep. 24, 2009

(51) Int. Cl.
*H04W 36/00* (2009.01)
(52) U.S. Cl. ........ 455/436; 455/437; 455/438; 455/439; 455/67.11; 455/226.1
(58) Field of Classification Search ........... 455/436–444
See application file for complete search history.

(56) References Cited

U.S. PATENT DOCUMENTS

| 4,718,081 A * | 1/1988 | Brenig ........................ 455/438 |
| 5,448,569 A | 9/1995 | Huang et al. |
| 5,754,945 A | 5/1998 | Lin et al. |
| 6,055,427 A | 4/2000 | Ojaniemi |
| 6,445,917 B1 | 9/2002 | Bark et al. |
| 6,490,451 B1 * | 12/2002 | Denman et al. ............... 455/436 |
| 6,496,493 B1 | 12/2002 | Chung |
| 6,546,252 B1 | 4/2003 | Jetzek et al. |
| 6,590,879 B1 | 7/2003 | Huang et al. |
| 6,615,044 B2 * | 9/2003 | Tigerstedt et al. ............ 455/437 |

(Continued)

FOREIGN PATENT DOCUMENTS

| EP | 1022920 | 6/2000 |
| WO | 00/38457 | 6/2000 |
| WO | 0221756 | 3/2002 |

OTHER PUBLICATIONS

International Search Report for PCT/SE2005/001886 dated Aug. 16, 2006.

(Continued)

*Primary Examiner* — Temica M Beamer

(57) ABSTRACT

The invention is directed towards determining whether a hard handover should be performed of a mobile station (48) in relation to a first group of cells (16, 18, 20, 24) including a number of active cells (16, 18, 20) and handled by a first cell handling device (10) to a second group of cells (32, 36, 38) handled by a second cell handling device (26), when the cell handling devices lack a direct communication link (Iur). Either the first cell handling device or the mobile station obtains measurements of link quality between the mobile station and cells of the groups, determines a first and second total quality factor for the groups, performs an evaluation of a preferred group involving comparing the first total quality factor with the second quality factor and initiates a handover from the first group to the second group if the second group is preferred.

24 Claims, 4 Drawing Sheets

U.S. PATENT DOCUMENTS

| | | | |
|---|---|---|---|
| 6,681,112 | B1 | 1/2004 | Schwartz et al. |
| 6,741,577 | B1 | 5/2004 | Henon |
| 6,845,238 | B1 | 1/2005 | Muller |
| 6,907,245 | B2 * | 6/2005 | Ohlsson et al. ............... 455/442 |
| 2003/0224730 | A1 | 12/2003 | Muszynski et al. |
| 2004/0147264 | A1 | 7/2004 | Ogawa |
| 2004/0224692 | A1 | 11/2004 | Hamabe |
| 2005/0288017 | A1 | 12/2005 | Doumenc et al. |
| 2008/0287130 | A1 | 11/2008 | Larola et al. |

OTHER PUBLICATIONS

International Preliminary Report on Patentability dated Feb. 7, 2008.

U.S. Appl. No. 11/793,420, filed Jun. 20, 2007; Inventor: Gunnarsson et al.

Office Action mailed Sep. 30, 2010 in co-pending U.S. Appl. No. 11/793,420.

International Search Report mailed Sep. 6, 2005 PCT/SE2004/001993.

International Preliminary Report on Patentability completed Mar. 19, 2007 in PCT/SE2004/001993.

PCT International Application—Amended Sheet dated Mar. 13, 2007 in PCT/SE2004/001993.

Notification of Transmittal of International Preliminary Report on Patentability for PCT/SE2005/001886 dated Feb. 13, 2008.

3$^{rd}$ Generation Partnership Project (3GPP); Technical Specification Group (TSG); Radio Access Network (RAN); Working Group 1 (WG1); Physical Layer—Measurements (FDD). TSGR#5(99)563, TS25.215 v2.0.0.TSG RAN Meeting No. 5 Kyongju, Korea. Oct. 1999.

* cited by examiner

NETWORK EVALUATED HARD HARDOVER USING PREDICTIONS

This application is the U.S. national phase of International Application No. PCT/SE2005/001886 filed 9 Dec. 2005 the entire contents of which are hereby incorporated by reference.

TECHNICAL FIELD OF THE INVENTION

The present invention relates to the field of handover in telecommunication networks. The invention more particularly relates to a method, a communication device, a telecommunication network as Well as computer program code for determining whether a hard handover should be performed of a mobile station in relation to a first group of cells comprising more than one cell and handled by a first cell handling device to a second group of cells comprising at least one cell and handled by a second cell handling device, where there is no direct communication link between the first and second cell handling devices and the first group includes a number of active cells that the mobile station is communicating with.

DESCRIPTION OF RELATED ART

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM). UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching centre (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks). MSCs and GSNs are in contact with a Home Location Register (HRL), which is a database of subscriber information.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link. An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

There are situations where the Iur connection does not exist between two RNCs. The reason for this may be that they are provided by different suppliers, that the RNCs are provided in networks operated by different operators or that the connection might be temporarily down. In these situations it is not possible to perform a soft handover.

If the cells supported by different RNCs are lacking such a connection, they are vulnerable to interference caused by a user equipment unit moving from an area served by a first RNC to an area served by a second RNC. As the RNCs often use the same frequency, this interference can be a serious problem that disturbs the communication in the cells supported by the second RNC because of the increasingly higher transmission effects needed. For inter-frequency it is important that handover is performed at the most appropriate time allowing a minimum of overlap between source and target cell and without the connection being lost.

The only way to avoid these problems today is to make handover from one cell to the other, i.e. by comparing one source cell with one target cell and then hand over. The risk of making the wrong decision is then quite high.

U.S. Pat. No. 6,845,238 describes ways to improve inter-frequency hard handover using a weighting function for an active set of cells and a virtual active set of cells.

There is therefore a need for an improved hard handover which takes care of such problems.

SUMMARY OF THE INVENTION

The present invention is therefore directed towards solving the problem of providing improved hard handover and then especially directed towards determining whether a hard handover should be performed of a mobile station in relation to a first and second cell handling device, when the cell handling devices lack a direct communication link.

This is generally solved through obtaining measurements of link quality between the mobile station and cells of a first group of cells including a number of active cells and handled by the first cell handling device and a second group of cells handled by the second cell handling device, determining a first total quality factor for the first group and a second total quality factor for the second group, performing an evaluation of a preferred group involving comparing the first total quality factor with the second quality factor and initiating a handover from the first group to the second group if the second group is preferred.

One object of the present invention is thus directed towards providing a method for determining whether a hard handover should be performed of a mobile station in relation to a first and second cell handling device, when the cell handling devices lack a direct communication link.

This object is according to a first aspect of the present invention achieved through a method of determining whether a hard handover should be performed of a mobile station in relation to a first group of cells comprising more than one cell and handled by a first cell handling device to a second group of cells comprising at least one cell and handled by a second cell handling device, where there is no direct communication link between the first and second cell handling devices and the first group includes a number of active cells that the mobile station is communicating with, comprising the steps of:
  obtaining measurements of link quality between the mobile station and all cells of the first group,
  obtaining measurements of link quality between the mobile station and all cells of the second group,
  determining a first total quality factor for the first group based on link quality measurements,
  determining a second total quality factor for the second group based on link quality measurements,
  performing an evaluation of a preferred group involving comparing the first total quality factor with the second quality factor, and initiating a handover from the first group to the second group in case the second group is preferred.

Another object of the present invention is directed towards providing a communication device, which determines whether an hard handover should be performed of a mobile station in relation to a first and second cell handling device, when the cell handling devices lack a direct communication link.

This object is according to a second aspect of the present invention achieved through a communication device for determining whether a hard handover should be performed of a mobile station in relation to a first group of cells comprising more than one cell and handled by a first cell handling device to a second group of cells comprising at least one cell and handled by a second cell handling device, where there is no direct communication link between the first and second cell handling devices and the first group includes a number of active cells that the mobile station is communicating with, comprising:
  a handover evaluating unit arranged to
    obtain measurements of link quality between the mobile station and all cells of the first group,
    obtain measurements of link quality between the mobile station and all cells of the second group,
    determine a first total quality factor for the first group based on link quality measurements,
    determine a second total quality factor for the second group based on link quality measurements,
    perform an evaluation of a preferred group involving comparing the first total quality factor with the second quality factor, and
    order the initiation of a handover from the first group to the second group in case the second group is preferred.

Another object of the present invention is directed towards providing a telecommunication network, which determines whether a hard handover should be performed of a mobile station in relation to a first and second cell handling device, when the cell handling devices lack a direct communication link.

This object is according to a third aspect of the present invention also achieved through a telecommunication network comprising
  at least one first cell handling device handling a number of cells for communication with mobile stations, said first cell handling device being arranged to determine whether a hard handover should be performed of a mobile station in relation to a first group of cells comprising more than one cell handled by said first cell handling device to a second group of cells comprising at least one cell and handled by a second cell handling device, where there is no direct communication link between the first and second cell handling devices and the first group includes a number of active cells that the mobile station is communicating with, wherein the network further comprises
  a handover evaluating unit arranged to
    obtain measurements of link quality between the mobile station and all cells of the first group,
    obtain measurements of link quality between the mobile station and all cells of the second group,
    determine a first total quality factor for the first group based on link quality measurements,
    determine a second total quality factor for the second group based on link quality measurements,
    perform an evaluation of a preferred group involving comparing the first total quality factor with the second quality factor, and
    order the initiation of a handover from the first group to the second group in case the second group is preferred.

Still another object of the present invention is directed towards providing a computer program product, which determines whether a hard handover should be performed of a mobile station in relation to a first and second cell handling device, when the cell handling devices lack a direct communication link.

This object is according to a fourth aspect of the present invention also achieved through a computer program product for determining whether a hard handover should be performed of a mobile station in relation to a first group of cells comprising more than one cell and handled by a first cell handling device to a second group of cells comprising at least one cell and handled by a second cell handling device, where there is no direct communication link between the first and second cell handling devices and the first group includes a number of active cells that the mobile station is communicating with, comprising computer program code to make a communication device perform, when said code is loaded into the communication device:

obtain measurements of link quality between the mobile station and all cells of the first group,
obtain measurements of link quality between the mobile station and all cells of the second group,
determine a first total quality factor for the first group based on link quality measurements,
determine a second total quality factor for the second group based on link quality measurements,
perform an evaluation of a preferred group involving comparing the first total quality factor with the second quality factor, and
order the initiation of a handover from the first group to the second group in case the second group is preferred.

The present invention has many advantages. It provides an improved way of determining if handover is to be performed or not. By considering all of the active cells in the first group, the risk of making a bad handover decision is reduced. In this way the risk of performing handover back and forth as well as the risk of keeping a mobile station too long in a network with consequential interference or a dropped connection, is reduced.

According to an advantageous variation of the present invention the first group of cells consists of, in addition to the active cells, at least one candidate cell that the mobile station is not communicating with. This has the advantage of even further reducing the risk of making a bad handover decision by also using the candidate cell in the first group. In this way a predictive decision can be taken, i.e. a decision based on where the mobile station seems to be moving. This predictive decision is then not only based on where the mobile station seems to be moving in the second access network but also where it seems to be moving in the first access network. By adding a candidate cell to the active cells in the first group it is thus easier to determine if it is better that the mobile station is to remain connected to the first cell handling device or to be handed over to cells handled by the second cell handling device as compared with if the decision is based only on the active cells and the second group.

The expression cell handling device as used herein is intended to comprise a device controlling a number of cells in a telecommunication network and determining which cell or cells a mobile station is to communicate with.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
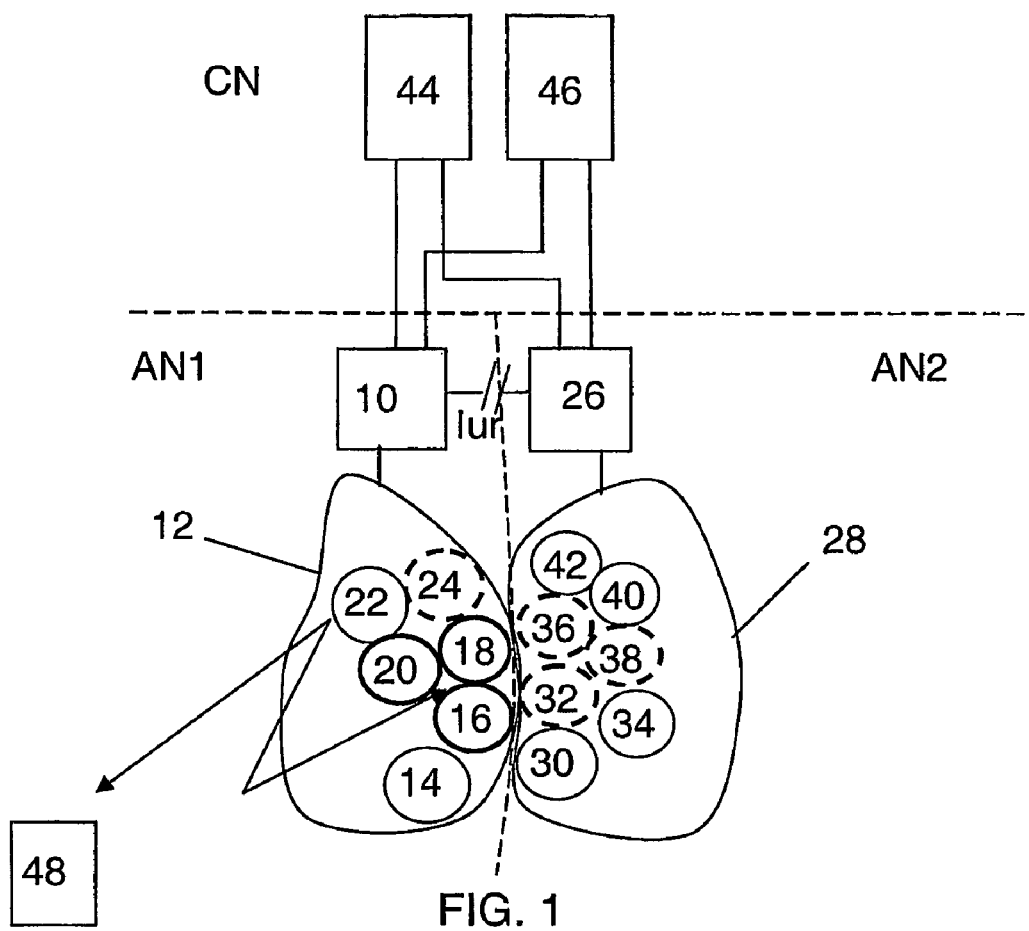
FIG. 1 schematically shows a first and a second access network connected to a core network as well as a mobile station connected to the first access network.

The present invention is described in the non-limiting, example context of a universal mobile telecommunications (UMTS) shown in FIG. 1. A core network CN has a first connection-oriented service node 44, which may be a Mobile Switching Centre (MSC) that provides circuit-switched services. The core network CN also includes a second General Packet Radio Service (GPRS) node 46 tailored to provide packet-switched type services, which is sometimes referred to as the serving GPRS service node (SGSN). The service node 44 may be connected to circuit switched networks such as PSTN or GSM. The node 46 may be connected to connectionless-oriented networks such as the Internet 14.

Each of the core network service nodes 44 and 46 connects to a first access network AN1, which is here a UMTS Terrestrial Radio Access Network (UTRAN) via a radio access network (RAN) interface referred to as the Iu interface (indicated with a dashed horizontal line. UTRAN AN1 includes one or more radio network controllers (RNC), where a first RNC 10 is shown. The core network CN is furthermore connected to a second access network AN2 via the RAN interface, which second access network is here also a UMTS Terrestrial Radio Access Network (UTRAN) including one or more RNCs, where a second RNC 26 is shown. The two networks are also being shown separated by a dashed essentially vertical line. Each RNC 10 and 26 is connected to a plurality of cells. The first RNC 10 is connected to a first 14, a second 16, a third 18, a fourth 20, a fifth 22 and a sixth 24 cell, where these cells are provided in a geographical area 12 covered by the first access network AN1. In the same way the second RNC 26 is connected to a seventh 30, an eighth 32, a ninth 34, a tenth 36, an eleventh 38, a twelfth 40 and a thirteenth 42 cell, where these cells are provided in a geographical area 28 covered by the second access network AN2. As is well known within the art each cell is served by a base station for communicating with user equipment. Thus a RNC is in reality connected to a number of base stations. In FIG. 1 one such user equipment unit in the form of a mobile station 48 is shown as connected to three cells in the first access network AN1, and here to the second 16, third 18 and fourth 20 cells. These cells are marked with thicker lines than the rest of the cells. The sixth cell 24 is shown as a dashed circle. The second, third, fourth and sixth cells 16, 18, 20 and 24 here make up a first group of cells that are handled by the first RNC 10. The eighth 32, a tenth 36 and eleventh 38 cells of the second network are also shown with dashed circles. These cells make up a second group of cells that are handled by the second RNC 26. The reason for this will be discussed shortly.

It should here be realised that the core network CN may include several more nodes that communicate with each other. It should also be realised that the two access networks AN1 and AN2 can be connected to different nodes in the core network CN. However, in order to simplify the description of the present invention, the two access networks AN1 and AN2 are shown as being connected to the same nodes 44 and 46 in FIG. 1.

RNCs are normally provided with an interface, a so-called Iur interface for communicating with each other. However, in FIG. 1 there is no such connection between them, as is indicated by a broken line.

Figure 2:
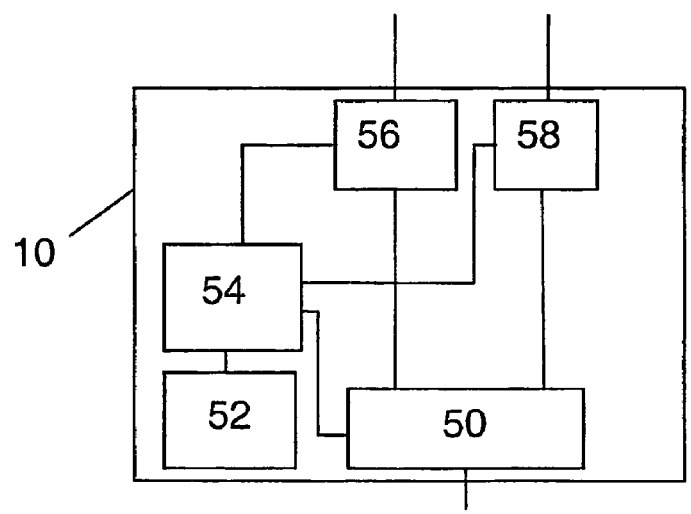
FIG. 2 shows a block schematic of different units provided in a radio network controller of the first access network.

FIG. 2 shows a block schematic of relevant parts of a communication device according to the invention. The communication device is a cell handling device, which handles or determines the cells a user equipment unit is to communicate with. In this example the cell handling device is the first RNC 10. It includes a first interface 50 for communication with base stations serving the different cells, a second interface 56 for communicating with the first core network node 44 and a third interface 58 for communication with the second core network node 46. It should here be realised that the different interface units 50, 56 and 58 may be provided with signal format conversion capabilities and switching capabilities in order to transmit data to the different network nodes. There is furthermore a control unit 54 connected to the different interface units 50, 56 and 58 for controlling the routing of data or packets to the right interface unit as well as for controlling the connection of the user equipment unit to the first access network. How packets are routed or circuit-switched connections are set up is well known within the art and will not be further described here. There is furthermore a first handover evaluating unit 52 connected to the control unit 54. The functioning of the first handover evaluating unit 52 will be described later.

Figure 3:
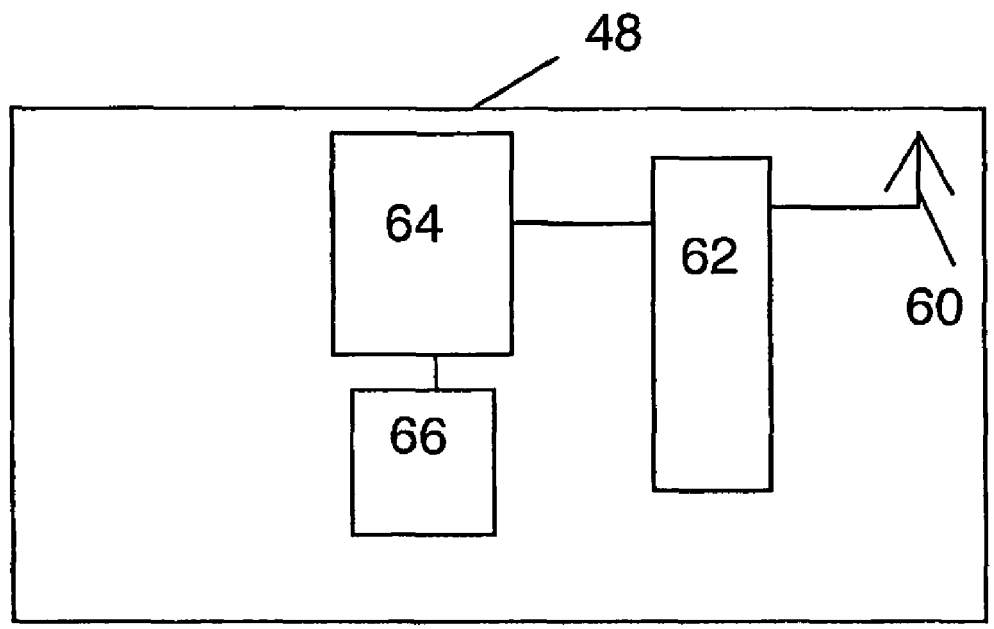
FIG. 3 shows a block schematic of different units provided in the mobile station.

FIG. 3 shows a block schematic of relevant part of another communication device according the invention, which is here a mobile station or a user equipment unit 48. This device 48 is equipped with an antenna 60 connected to a radio communication unit 62 for providing radio communication. The radio communication unit 62 is connected to a mobile station control unit 64, which is being connected to a second handover evaluating unit 66. The control unit 62 controls the supply and reception of data to and from the radio communication unit 62 in a known manner. It may furthermore supply handover related information, which is provided by the second handover evaluating unit 66. The second handover evaluating unit 66 furthermore controls measurements of link quality, which measurements may be carried out by the radio communication unit 62.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 48 is assigned its own scrambling code in the uplink in order for a base station to identify transmissions from that particular user equipment unit (UE). In the downlink a combination of scrambling code and channel code are used for the user equipment unit (UE) to identify transmissions from the base station intended for that user equipment unit (UE) from all of the other transmissions and noise present in the same area.

Different types of control channels may exist between one of the base stations and user equipment units (UEs) 48. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Traffic channels (TCH) may be allocated to carry substantive call communications with a user equipment unit (UE).

The common pilot channel (CPICH) need not carry explicit data. Rather the code and physical appearance of the common pilot channel (CPICH) provide the user equipment unit (UE) with information. For example, the user equipment unit (UE) uses the common pilot channel (CPICH) for handover evaluation measurements or to get a good channel estimate to adjust the receiver optimally for other physical channels transmitted for that cell.

As shown in FIG. 1, a user equipment unit (UE) may be communicating with plural base stations or cells. Even when idle, user equipment units (UEs) monitor or scan the control channel broadcasts from neighboring cells.

In the present invention, user equipment units (UEs) may be employed to provide measurement reports so that the UTRAN receives real-time knowledge of the network conditions based on one or more parameters measured by the user equipment units (UEs). The sending of a measurement report may be event triggered, as described (for example) in U.S. patent application Ser. No. 09/314,019, filed May 19, 1999, entitled "Mobile Station Measurements With Event-Based Reporting" (incorporated herein by reference).

Consequently, real-time knowledge of network conditions can be selectively conveyed at relevant moments so the UTRAN can effectively respond without delay and without excessive signalling overhead. An adaptive set of predetermined "events" and/or predetermined "conditions" may be defined that trigger measurement reports to be sent from the user equipment unit (UE). Once the report is received, the UTRAN may then analyze the reported information and perform, if necessary, responsive or other desirable operations like handover, power control, operations and maintenance, network optimization, and other procedures.

As illustrated in FIG. 1, the user equipment unit (UE) 48 is tuned to or is communicating with a number of active cells, typically three that are handled by the first RNC 10. These cells are provided in the first group of cells. As shown in FIG.

1, the active cells comprise cell 16, cell 18, and cell 20, all utilizing the same frequency. The user equipment unit (UE) 48 maintains a list of the active cells, which list is typically updated over time by the network (e.g., RNC 10) as user equipment unit (UE) travels or as other conditions change.

In the present invention, the user equipment unit (UE) 48 also maintains in the first group of cells, along with the active cells, at least one candidate cell. The candidate cell is a cell also handled by the first RNC 10. The candidate cell is a cell that, apart from the cells the user equipment unit 48 is communicating with, has the most promising link quality. Link quality will be discussed in more detail later. The user equipment unit may also keep a list of a second group of cells of the second access network AN2 that are handled by the second RNC 26. These cells show promising link qualities. This normally happens when the user equipment unit 48 is close to the border of this second network or has moved into the region 28 covered by it. The second group, which may include only one cell, is here made up of cells 32, 36 and 38 of the second network AN2. All the cells may here operate at the same frequency. In the present example the first group of cells is included in a system maintained by a first operator, while the second group of cells is included in a system maintained by a second operator. Alternatively, of the first group of cells may be included in a network of a first technology type/generation (e.g., UTRAN), while there second group of cells may be included in a network of a second technology type/generation (e.g., IS-95, CDMA 2000, etc.) It is also possible that the different groups are provided in the same network but the RNCs are provided by different suppliers that do not communicate with each other. It is also possible that the RNCs would normally be communicating via a Iur interface, which is temporarily down.

The user equipment unit (UE) provides measurements relative to both the first group and the second group. Then, when measurements so warrant, the first RNC triggers a hard handover to the second group of cells handled by the second RNC via the core network. It may also issue a handover command to the user equipment unit (UE), so that the user equipment unit (UE) then communicates with the second group. That is, the telecommunications network performs a hard handover for a connection with user equipment unit (UE) 30 by switching from the current active cells to the second group.

Figure 4:
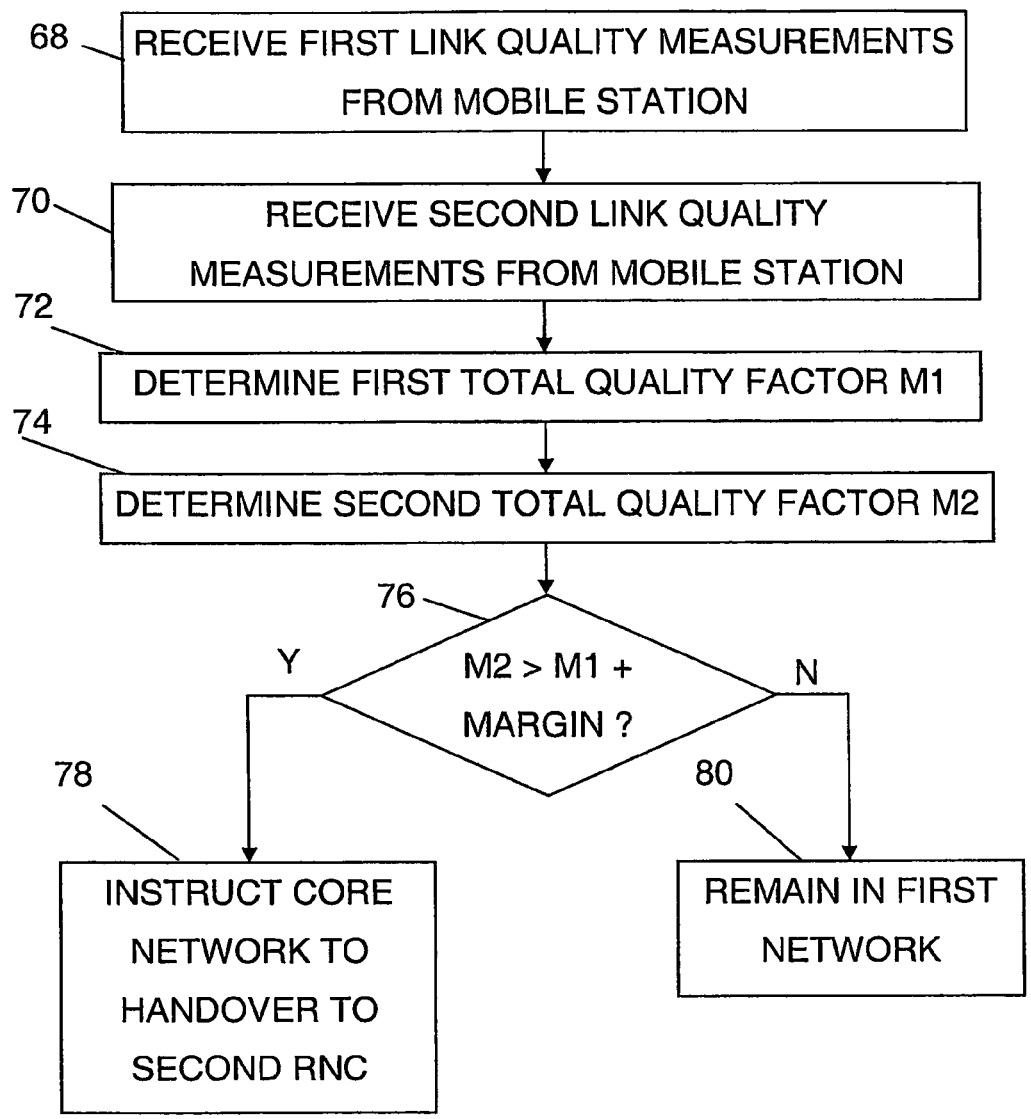
FIG. 4 shows a flow chart of a number of method steps according to a first embodiment of the present invention being carried out in the radio network controller of FIG. 2.

A sequence of basic steps involved in a first embodiment of the present invention is illustrated in FIG. 4

The normal procedure when a user equipment unit is moving towards an area covered by cells handled by another RNC than the one it is currently in contact with is to make soft handover. This means that as the user equipment moves in a network, cells are added to and deleted from the active cells. This is normally done through the user equipment comparing a link quality value of cells with a threshold and reports to the RNC in question, here the first RNC 10, the cells that are above that threshold. The first RNC 10 then adds and removes cells based on this information. It should here be realised that the quality of the connection is not everything that is considered by the RNC when selecting cells to add, but that other factors also influence the selection such as the amount of traffic in a cell. This is furthermore normally done independently of the border between areas covered by a RNC, since the neighbouring RNCs can communicate directly with each other. In this way a user equipment is gradually or softly handed over from one RNC to another. However in the systems of FIG. 1 this is not possible because of a lack of direct connection between the RNCs 10 and 26. As a user equipment 48 is moving from one area to the other using the same frequency, there is a need to increase the power of the mobile station and of the base stations it is communication with, which will disturb the communication on that frequency in the neighbouring area. This is highly undesirable.

Prior to actual handover, i.e., when the user equipment unit (UE) 48 is communicating with the active cells 16, 18 and 20 of the first group close to the border to the second access network, the first access network (e.g., RNC 10), informs the user equipment unit (UE) 48 of cells for which it needs link quality measurements. This can be performed using, e.g., a series of measurement control messages.

According to the invention, the first handover evaluating unit 52 in the first RNC 10 requests, via the control unit 54 and the first interface unit 50, link quality measurements from the user equipment on a first group of cells, which include the cells it is communicating with in the first access network, cells 16, 18 and 20 as well as a cell in the first access network that the user equipment is not communicating with, but would be a candidate for being communicated with in case the mobile station were to stay in the first access network. This cell is here cell 24. The candidate cell is a cell that has a higher link quality than other cells the mobile station is not communicating with. The first handover evaluating unit 52 furthermore requests link quality regarding the second group of cells of the second network, which are here cells 32, 36 and 38.

The requests may be sent using measurement control messages as described in U.S. Pat. No. 6,845,238, which is herein incorporated by reference. The request is preferably included in the logical channel DCCH, but can be included in another logical channel in that cell. One example of such a logical channel is BCCH. In the request generally, qualitative and/or quantitative parameters may be specified and measured. Non-limiting example parameters include measured signal strength, signal power, estimated bit error rate, signal-to-interference ratio, path loss, etc.

As an alternative the user equipment unit (UE) can report measurements on is own initiative, where the measurement report may be event-driven (e.g. triggered by a specified triggering event).

Events for triggering measurements are normally the events which trigger the reporting of soft handover measurements. Such events can include, for example, the following: a primary CPICH enters the reporting range (for an FDD network); a primary CPICH leaves the reporting range (FDD only); a non-active primary CPICH becomes better than an active primary CPICH (FDD): a change of best cell (FDD); and, a primary CPICH becomes better or worse than an absolute threshold (FDD).

The second handover evaluating unit 66 of the user equipment 48 receives this request via the antenna 60, radio communication unit 62 and control unit 64. Thereafter the second handover evaluating unit 66 performs link quality measurements regarding the two groups and sends the results to the first RNC 10. In performing link quality measurements, the second handover evaluating unit 66 is assisted by the radio communication unit 62.

The first RNC 10 obtains first link quality measurements through receiving them from the mobile station 48, step 68, which are the link quality measurements of the first group, and then obtains second link quality measurements through receiving them from the mobile station 48, step 70, which measurements are the link quality measurements of the second group. The results are then received in the first handover evaluating unit 66. The first handover evaluating unit 66 thereafter determines a first total quality factor M1 for the first group, step 72, and a second total quality factor M2 for the second group, step 74. Then the first handover evaluating unit performs a comparison of the second total link quality M2 with the first total link quality M1 and a safety margin. If the second total quality factor M2 was larger than the first total quality factor M1 plus the safety margin, step 76, the control unit 54 of the first RNC 10 is informed of this fact, and it goes on and initiates a handover through instructing the core network CN that the user equipment is to be handed over to the second access network AN2, step 78. It may then also indicate the second RNC 26 as well as the second group of cells as the cells that a handover is to be made to as well as inform the user equipment unit 48 that a handover is to be made. If however it was not, step 76, the user equipment unit 48 is kept in the first access network, step 80. Here there are further choices that can be made. The active cells can remain unchanged or the RNC 10 may drop communication with one of the cells 16, 18 or 20 and start communicating with cell 24 instead of the dropped cell. As an alternative the RNC 10 may add cell 24 to the active set without dropping any of cells 16, 18 and 20.

According to the invention the first total quality factor M1 is determined based on weighted measurement results of the first group of cells and may here be determined according to the equation below:

$$M = W \cdot 10 \cdot \text{Log}\left(\sum_{i=1}^{N_A} M_i\right) + (1-W) \cdot 10 \cdot \text{Log} M_{Best},$$

The variables in this equation are defined as follows:
$M_i$ is a measurement result of cell i in the first group,
$N_A$ is the number of cells in the first group,
$M_{Best}$ is the measurement result of the cell in the first group having the best measurement result,
W is a weight parameter, and
M corresponds to the first total quality factor M1.

Different values of W may here be selected depending on different situations. Generally though a setting of W=0, provides the use of only the measurement results from the best cell, W=1 provides the use of the sum of the measurement results from the cells in the group in question without specially considering the best cell, and when W=2, the sum of the measurement results have a weight of 2, while the best cell has a weight of 1. Thus, here the total quality factor is estimated on all cells but with the influence reduced from the best cell. This can be useful for determining that a user equipment unit can receive the signal from more than one cell before handover is performed. The value W may furthermore be changed during operation of the first access network AN1 depending on various circumstances. For instance if one cell of the active cells has a much better link quality than the others, it may be set to 0 or close to 0, while another value may be selected if the link qualities of the active cells are very close to each other, like the value of 1 or close to 1. The value of W might range between (−1) and 2, and then preferably between 0 and 1. However other ranges are also feasible.

Two measurements, taken from TSGR#5(99)563, RAN 25.215 v.2.0.0, "Physical Layer-Measurements (FDD)", can be used in the equation. A first of these measurements is CPICH RSCP, which is essentially the signal strength received on the code used for the CPICH in a cell (where $M_i$ and $M_{Best}$ are in milliwatt and M is in dBm in the equation). A second of these measurements is CPICH Ec/N0, which is the signal to noise ratio received on the code used for the CPICH in a cell (where $M_i$ and $M_{Best}$ are ratios and M is in dB in the equation). As mentioned above measurements may be made on signal strength, signal power, estimated bit error rate, signal-to-interference ratio, path loss, etc.

The equation above thus gives a total quality value in dB. It should be realised that it may be changed for being expressed in the corresponding basic unit of the quality measurement, i.e., if power is measured it may be adapted for determining the power in watt instead of dBm. The equation may also be expressed differently if the link quality is based on path loss.

The equation mentioned above may also be used for determining the second total quality factor M2 in the same way. However another equation might also be used. As mentioned above the second group may comprise only one cell. As is evident from the equation, this is actually the same as only using the quality value of that cell as a total quality value.

The equation is furthermore also used by the user equipment unit in determining cells that are provided above the previously described threshold. It is furthermore used in the above referenced U.S. Pat. No. 6,845,238 for determining inter-cell hard handover.

When comparing the two total quality factors M1 and M2 with each other a safety margin is used. This safety margin can be an adjustable parameter that controls how much better the quality of the second group needs to be compared with the first group in order for hard handover to be initiated. The safety margin may also be a fixed threshold. The safety margin should be set such that handover back and forth between the areas covered by the first and second RNC is avoided. It may optionally be omitted.

Figure 5:
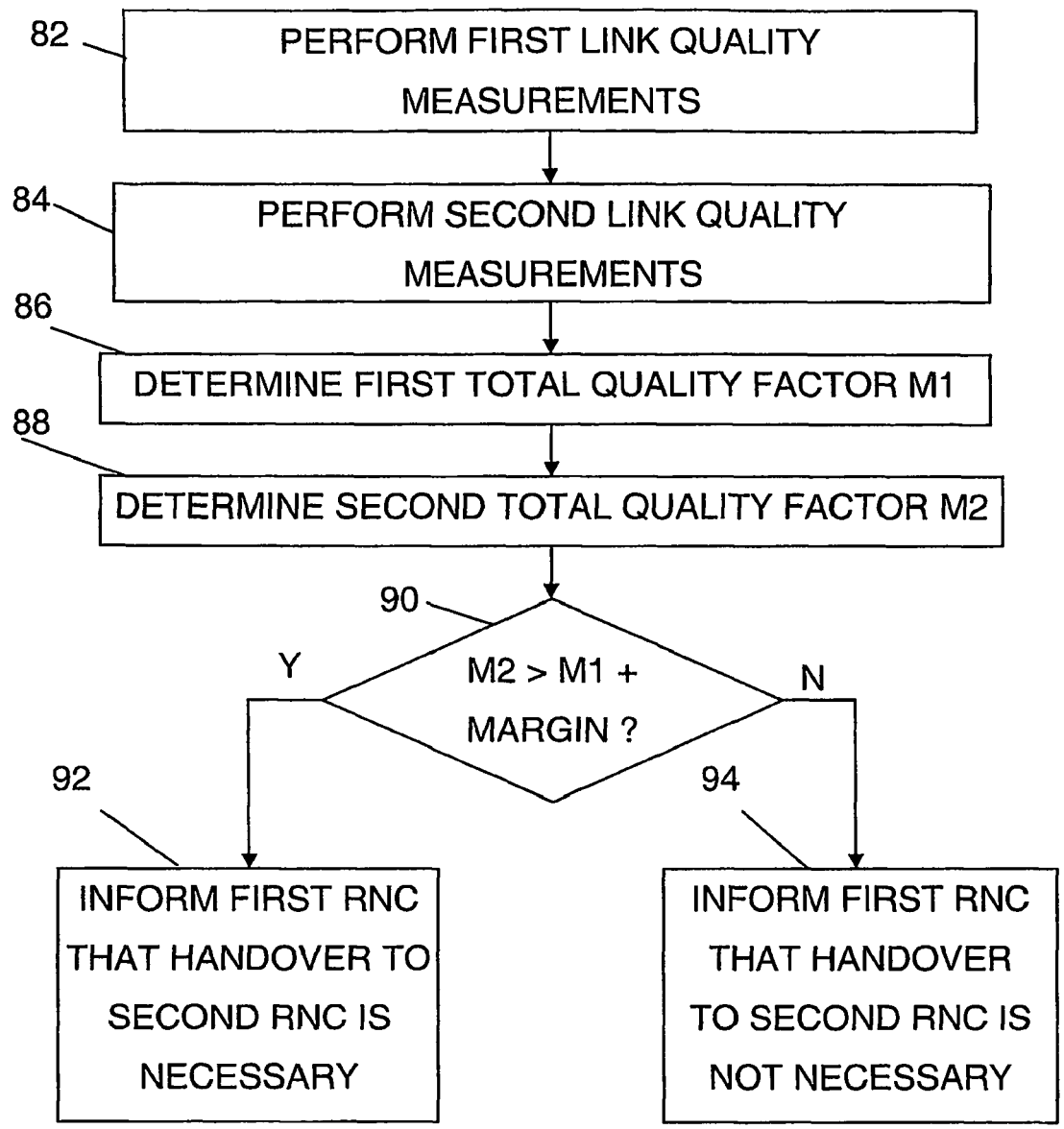
FIG. 5 shows a flow chart of a number of method steps according to a second embodiment of the present invention being carried out in the mobile station according to claim 3, and FIG. 6 schematically shows a computer program product in the form of a CD Rom disc comprising computer program code for carrying out the invention.

It is also possible to perform the handover evaluation in the mobile station instead. A sequence of basic steps involved in a second embodiment of the present invention is illustrated in FIG. 5. Here the first access network AN1 authorizes the user equipment unit (UE) to perform an autonomous indication of if handover should be made or not.

The second handover evaluating unit 66 receives a set of rules to be used when determining if a handover should be performed. The user equipment unit 48 then continuously and independently obtains link quality measurements of cells it is able to communicate with. Some of these cells then belong to the second access network AN2 and some to the first access network AN1. Of these cells in the first network it then forms the first group of cells, including the active cells 16, 18 and 20 and at least one candidate cell 24 and a second group of cells comprising the most promising candidate cells 32, 36, 38 in the second access network AN2. The link quality measurements are here obtained through performing first link quality measurements on the first group, step 82, as well as on the second group, step 84. Now the second handover evaluating unit 66 determines the first total quality factor M1, step 86, and the second total quality factor M2, step 88, in the same way as was described above. Thereafter the second handover evaluating unit 66 performs a comparison of the second total link quality M2 with the first total link quality M1 and a safety margin. If the second total quality factor M2 was larger than the first total quality margin M1 plus the safety margin, step 90, the second handover evaluating unit 66 initiates a handover through informing the first RNC 10 that a handover should be made to the second group of cells, step 92, for instructing the core network CN that the mobile station is to be handed over to the second access network AN2. If then a handover is not performed by the network, the mobile station will continue to send such information. If however it was not, step 90, the first RNC 10 is informed by the second handover evaluating unit 66 that the mobile station 48 should be kept in the first access network and that handover is not necessary, step 90.

The first RNC 10 may then order a handover if it deems it necessary, which is done in the same way as in the first embodiment, or keep the mobile station in the first access network AN1 and then either keep the current active cells or update them with the candidate cell. In this second embodiment the first RNC may also transmit the value W to be used in said equation. A default value may of course also be used.

While various examples above have been provided with respect to a FDD mode of operation, it should be understood that principles of the invention are also applicable to handover from the TDD mode of operation to the FDD mode of operation, or handover from any system, e.g. GSM/GPRS to the FDD mode of operation. The invention may be limited to intra-frequency handover. However it may also be used in inter-frequency handover.

The present invention has several advantages. It provides an improved way of determining if handover is to be performed or not. By considering all of the active cells in the first group, the risk of making a bad handover decision is reduced. In this way the risk of performing handover back and forth as well as the risk of keeping a mobile station too long in a network with consequential interference, is reduced. This risk is even further reduced by also using a candidate cell in the first group. In this way a predictive decision can be taken, i.e. a decision based on where the mobile station seems to be moving. This predictive decision for deciding of a hard handover is to be made or not from the first access network to the second access network is then not only based on where the mobile station seems to be moving in the second access network but also where it seems to be moving in the first access network.

Figure 6:
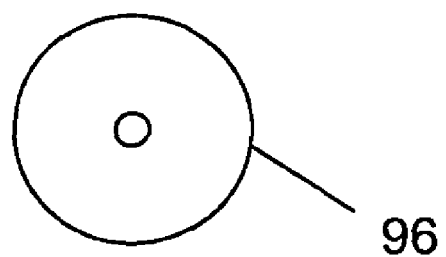

The handover evaluating units according to the present invention can be implemented through one or more processors together with computer program code for performing the functions of the invention. The program code mentioned above may also be provided as a computer program product, for instance in the form of a data carrier carrying computer program code for performing the method according to the present invention when being loaded into the mobile station and/or the first RNC. One such carrier 96, in the form of a CD ROM disc is generally outlined in FIG. 6. It is however feasible with other data carriers such as a memory stick. The computer program code can furthermore be provided as pure program code on a server and downloaded to the RNC or the mobile station remotely.

There are several variations that are possible to make of the present invention. The comparison may be performed without safety margin. The first group may include only the active set of cells. Thus the use of the candidate cell is optional. The first group may also include more than one candidate cell, where the candidate cells normally are cells that have a higher link quality than other cells the RNC is not communicating with. The invention is furthermore not limited to the above described equation. Another equation using weighted quality measurements may be used. The second handover evaluation unit of the mobile station can furthermore be combined with the radio communication unit. The invention is not limited to being practised in an RNC and a mobile station. Instead of in an RNC it may be practised in a base station or any node where cell evaluation is performed in a telecommunication network. Handover is not limited to different networks. It can be applied in the same access network or between networks of different types. The invention may furthermore be combined with soft handover and inter-frequency hard handover according to U.S. Pat. No. 6,845,238.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method of determining whether a hard handover should be performed of a mobile station in relation to a first group of cells comprising more than one cell and handled by a first cell handling device to a second group of cells comprising at least one cell and handled by a second cell handling device, where there is no direct communication link between the first and second cell handling devices and the first group includes a number of active cells that the mobile station is communicating with, comprising the steps of:
    obtaining measurements of link quality between the mobile station and all cells of the first group,
    obtaining measurements of link quality between the mobile station and all cells of the second group,
    determining a first total quality factor for the first group based on link quality measurements,
    determining a second total quality factor for the second group based on link quality measurements,
    performing an evaluation of a preferred group involving comparing the first total quality factor with the second quality factor, and
    initiating a handover from the first group to the second group in case the second group is preferred.

2. The method of claim 1, wherein the first group consists of, in addition to the active cells, at least one candidate cell that the mobile station is not communicating with.

3. The method of claim 2, wherein a candidate cell is a cell for which measurement results indicates a higher link quality than the link qualities of other cells the mobile station is not communicating with.

4. The method of claim 2, wherein the second group consists of a single candidate cell.

5. The method of claim 1, wherein the determining of a first total quality factor comprises combining weighted measurement results of the first group of cells.

6. The method of claim 5, wherein the determining of a second total quality factor comprises combining weighted measurement results of the second group of cells.

7. The method of claim 5, wherein the determining of a total quality factor is based on the equation:

$$M = W \cdot 10 \cdot \text{Log}\left(\sum_{i=1}^{N_A} M_i\right) + (1-W) \cdot 10 \cdot \text{Log} M_{Best},$$

where W is a weighting factor, $M_{Best}$ is the quality factor of the cell having the best quality and $M_i$ are quality factors of the different cells of the group.

8. The method of claim 7, wherein the weighting factor W is in the range between −1 and 2.

9. The method of claim 1, wherein the steps of obtaining measurements of link quality comprises receiving measurements of link quality from the mobile station, and the step of initiating a handover comprises informing a core network that a handover is necessary to the second group of cells.

10. The method of claim 1, wherein the steps of obtaining measurements of link quality comprises performing measurements of link quality, and the step of initiating a handover comprises informing the first cell handling device that a handover is necessary to the second group of cells.

11. A communication device for determining whether a hard handover should be performed of a mobile station in relation to a first group of cells comprising more than one cell and handled by a first cell handling device to a second group of cells comprising at least one cell and handled by a second cell handling device, where there is no direct communication link between the first and second cell handling devices and the first group includes a number of active cells that the mobile station is communicating with, comprising: a handover evaluating unit arranged to obtain measurements of link quality between the mobile station and all cells of the first group, obtain measurements of link quality between the mobile station and all cells of the second group, determine a first total quality factor for the first group based on link quality measurements, determine a second total quality factor for the second group based on link quality measurements, perform an evaluation of a preferred group involving comparing the first total quality factor with the second quality factor, and order the initiation of a handover from the first group to the second group in case the second group is preferred.

12. The communication of claim 11, wherein the first group consists of, in addition to the active cells, at least one candidate cell that the mobile station is not communicating with.

13. The communication of claim 12, wherein a candidate cell is a cell for which the measurement results indicates a higher link quality than the link qualities of other cells the mobile station is not communicating with.

14. The communication of claim 11, wherein the second group consists of a single candidate cell.

15. The communication of claim 11, wherein the determining of a first total quality factor comprises combining weighted measurement results of the first group of cells.

16. The communication of claim 15, wherein the determining of a second total quality factor comprises combining weighted measurement results of the second group of cells.

17. The communication of claim 15, wherein the determining of a total quality factor is based on the equation:

$$M = W \cdot 10 \cdot \mathrm{Log}\left(\sum_{i=1}^{N_A} M_i\right) + (1 - W) \cdot 10 \cdot \mathrm{Log} M_{Best},$$

where W is a weighting factor, $M_{Best}$ is the quality factor of the cell having the best quality and $M_i$ are the quality factors of the different cells of the group.

18. The communication of claim 17, wherein the weighting factor W is in the range between −1 and 2.

19. The communication of claim 11, wherein the device is a cell handling device, where the handover evaluating unit when obtaining measurements of link quality is arranged to receive measurements of link quality from the mobile station and when initiating a handover is arranged to inform a core network that a handover is necessary to the second group of cells.

20. The communication of claim 11, wherein the device is a mobile station, where the handover evaluating unit when obtaining measurements of link quality is arranged to perform measurements of link quality and when initiating a handover is arranged to inform the first cell handling device that a handover is necessary to the second group of cells.

21. A telecommunication network comprising:
at least one first cell handling device handling a number of cells for communication with mobile stations, said first cell handling device being arranged to determine whether a hard handover should be performed of a mobile station in relation to a first group of cells comprising more than one cell handled by said first cell handling device to a second group of cells comprising at least one cell and handled by a second cell handling device, where there is no direct communication link (Iur) between the first and second cell handling devices and the first group includes a number of active cells that the mobile station is communicating with, wherein the network further comprises
a handover evaluating unit arranged to
  obtain measurements of link quality between the mobile station and all cells of the first group,
  obtain measurements of link quality between the mobile station and all cells of the second group,
  determine a first total quality factor for the first group based on link quality measurements,
  determine a second total quality factor for the second group based on link quality measurements,
  perform an evaluation of a preferred group involving comparing the first total quality factor with the second quality factor, and
  order the initiation of a handover from the first group to the second group in case the second group is preferred.

22. The telecommunication network of claim 21, wherein the handover evaluating unit is provided in the first cell handling device.

23. The telecommunication network of claim 21, wherein the handover evaluating unit is provided in the mobile station.

24. A computer program product for determining whether a hard handover should be performed of a mobile station in relation to a first group of cells comprising more than one cell and handled by a first cell handling device to a second group of cells comprising at least one cell and handled by a second ceil handling device, where there is no direct communication link between the first and second cell handling devices and the first group includes a number of active cells that the mobile station is communicating with, comprising computer program code to make a communication device perform, when said code is loaded into the communication device:
  obtain measurements of link quality between the mobile station and all cells of the first group,
  obtain measurements of link quality between the mobile station and all cells of the second group,
  determine a first total quality factor for the first group based on link quality measurements,
  determine a second total quality factor for the second group based on link quality measurements,
  perform an evaluation of a preferred group involving comparing the first total quality factor with the second quality factor, and
  order the initiation of a handover from the first group to the second group in case the second group is preferred.

* * * * *

UNITED STATES PATENT AND TRADEMARK OFFICE
CERTIFICATE OF CORRECTION

PATENT NO. : 8,135,407 B2  
APPLICATION NO. : 12/083343  
DATED : March 13, 2012  
INVENTOR(S) : Fallgren et al.

Page 1 of 1

It is certified that error appears in the above-identified patent and that said Letters Patent is hereby corrected as shown below:

In Column 1, Line 14, delete "Well" and insert -- well --, therefor.

In Column 6, Line 24, delete "invention," and insert -- invention. --, therefor.

In Column 9, Line 26, delete "there" and insert -- their --, therefor.

In Column 16, Line 40, in Claim 24, delete "ceil" and insert -- cell --, therefor.

Signed and Sealed this  
Thirtieth Day of October, 2012

David J. Kappos  
*Director of the United States Patent and Trademark Office*